(12) United States Patent
Röder et al.

(10) Patent No.: US 7,318,517 B2
(45) Date of Patent: Jan. 15, 2008

(54) PROCESS SYSTEM AND DEVICE FOR TRANSPORTING SUBSTRATES

(75) Inventors: Mario Röder, Gelnhausen (DE);
Andreas Caspari, Seligenstadt (DE);
Cristof Klesen, Modautal (DE)

(73) Assignee: Leybold Optics GmbH, Alzenau (DE)

( * ) Notice: Subject to any disclaimer, the term of this patent is extended or adjusted under 35 U.S.C. 154(b) by 0 days.

(21) Appl. No.: 11/507,320

(22) Filed: Aug. 21, 2006

(65) Prior Publication Data
US 2007/0063590 A1 Mar. 22, 2007

Related U.S. Application Data

(63) Continuation of application No. PCT/EP2005/005897, filed on Jun. 1, 2005.

(30) Foreign Application Priority Data
Aug. 2, 2004 (DE) ...................... 10 2004 037 622

(51) Int. Cl.
*B65G 35/00* (2006.01)
(52) U.S. Cl. .................................... 198/619; 414/749.2
(58) Field of Classification Search ................ 198/619, 198/805; 104/284, 286; 414/749.2
See application file for complete search history.

(56) References Cited

U.S. PATENT DOCUMENTS

| 5,086,729 | A | | 2/1992 | Katagiri |
| 5,170,714 | A | | 12/1992 | Katagiri |
| 5,284,411 | A | * | 2/1994 | Enomoto et al. ........... 198/619 |
| 5,398,804 | A | * | 3/1995 | Ecker et al. ................ 198/619 |
| 6,045,319 | A | * | 4/2000 | Uchida et al. .............. 198/619 |
| 6,361,268 | B1 | | 3/2002 | Pelrine et al. |

FOREIGN PATENT DOCUMENTS

DE 102 47 909 A1 4/2004
EP 0 346 815 A2 12/1989

* cited by examiner

*Primary Examiner*—James R. Bidwell
(74) *Attorney, Agent, or Firm*—Laurence A. Greenberg; Werner H. Stemer; Ralph E. Locher

(57) ABSTRACT

A process system contains a device for transporting substrates along a transport path. The device contains a bearing module and a drive module. The bearing module has a bearing stator with actuators embodied in the form of electromagnets and a bearing rotor with a ferromagnetic component. At least two of the actuators are disposed at a distance from each other and define at least one pair of actuators with an associated gap area formed therebetween. An active magnetic bearing of the bearing rotor is provided in the gap area.

15 Claims, 3 Drawing Sheets

PROCESS SYSTEM AND DEVICE FOR TRANSPORTING SUBSTRATES

CROSS-REFERENCE TO RELATED APPLICATIONS

This is a continuing application, under 35 U.S.C. §120, of copending international application PCT/EP2005/005897, filed Jun. 1, 2005, which designated the United States; this application also claims the priority, under 35 U.S.C. §119, of German patent application DE 10 2004 037 622.0, filed Aug. 2, 2004; the prior applications are herewith incorporated by reference in their entirety.

BACKGROUND OF THE INVENTION

FIELD OF THE INVENTION

The invention relates to a process system and to a device for transporting substrates along a transport path. The device has a bearing module and a drive module. The bearing module has a bearing stator with actuators formed as electromagnets and a bearing rotor with a ferromagnet component.

Increasingly larger substrates are demanded for the production of optical displays. Displays of this type have applications primarily in small and medium-sized display systems for, by way of example, mobile phones, DVD players, notebooks, TV sets, car radios, or in industrial use. Liquid crystal displays are currently predominant with over 80%, while alternative manufacturing methods are already in existence for plasma displays with currently 15% and organic light emitting diodes with currently 2%. In the case of the aforementioned alternative manufacturing methods, in particular, increased requirements are imposed on the process reliability for achieving high uniformity in the surface processing, in particular the coating of substrates, which requirements have been achievable only with difficulties hitherto in the context of increasing substrate size and increasing substrate weight.

Published European patent application EP 0 346 815A2, corresponding to U.S. Pat. Nos. 5,086,729 and 5,170,714, discloses a transport system for a vacuum installation having a support device and a transport device for material to be processed. The transport devices contains an active magnetic mounting with an essentially parallelepipedal bearing stator and a bearing rotor partly enclosing the latter. The bearing stator has electromagnets which interact with assigned ferromagnetic elements of the bearing rotor for generating a magnetic supporting field. Reliable process control of the magnetic mounting in the case of the known system is complicated on account of the construction-dictated soft rotor dynamics.

Published, non-prosecuted German patent application DE 102 47 909 A1 furthermore discloses a device for transporting substrates in the form of a contactlessly mounted and contactlessly driven, stopped and positioned conveyor system. The system is magnetically mounted passively on two supporting strips. The drive for acceleration and deceleration is effected by linear asynchronous motors embodied as long or short stator type. Stopping is realized by an eddy current brake that can be engaged by a lifting mechanism. Positioning is effected by permanent magnets situated in the carrier. A transverse stabilization is furthermore provided, a steel band being disposed on both sides of the carrier along the traveling route, two to four electrically excited magnet systems being situated opposite the steel band on the carrier. The drive is effected contactlessly by virtue of stators of linear motors being situated along the traveling route, which stators generate a traveling magnetic field in the desired direction of movement. The carrier has on its underside, opposite the stator, the secondary part of the linear motor, the secondary part usually containing aluminum. A solid steel plate is disposed as a magnetic return path above the secondary part, via which plate the magnetic flux of the stator can be closed, and this ensures a small air gap for the stator flux.

SUMMARY OF THE INVENTION

It is accordingly an object of the invention to provide a process system and a device for transporting substrates which overcomes the above-mentioned disadvantages of the prior art devices of this general type, which is compact and process-reliable. The device for transporting substrates is ideal, in particular for large-area, thin substrates, a substrate being able to moved between different process stations in a coating process line with high process reliability and dynamics.

The process system according to the invention contains a device for transporting substrates along or on a transport path. The device has a bearing module and a drive module. The bearing module has a bearing stator with actuators formed as electromagnets and a bearing rotor with a ferromagnet component. An actuator pair with an assigned gap region is formed by at least two of the actuators disposed at a distance from one another, and an active magnetic mounting of the bearing rotor in the gap region is provided. A position control with distance sensors is present for the active magnetic mounting.

The magnetic mounting of the bearing rotor in the gap region leads to a stiffening of the dynamics of the bearing module according to the invention in comparison with the prior art and improved rotor dynamics. As a result, the bearing module can be guided even with very heavy and large substrates, for example wafers having square meter dimensions, in particular reliably through locks into various chambers of the coating process line, without tipping leading to the transport module becoming caught or to damage to the substrate. The process is thereby simplified and also accelerated. Operating personnel do not have to intervene manually in order to discharge the substrate from a process chamber by a lock and to introduce it into the next process chamber by a lock and to put it back onto the transport path. The transport path is preferably interrupted, in particular by locks in the coating process line which separate e.g. chambers with different pressure stages or atmospheres from one another in an airtight fashion. In order to obtain particularly stable mounting, the bearing rotor is preferably held on both sides by in each case two mutually opposite actuators or electromagnets.

Besides its generic features, the device according to the invention for transporting substrates has the features that an actuator pair with an assigned gap region is formed by at least two actuators disposed at a distance from one another and active magnetic mounting of the bearing rotor in the gap region is provided.

The device is situated within a housing preferably formed from metal. It is thereby possible to achieve an electromagnetic compatibility (EMC protection) for example in respect of cathodes and/or other elements operated at high frequency in coating chambers and/or etching chambers and/or cleaning chambers of the coating process line. The housing is preferably water-cooled.

In one favorable configuration, provision is made of a catch bearing for holding the bearing rotor in the event of malfunctions of the control or in the event of power failure. The catch bearing is preferably disposed on inner walls in the housing of the device, for example as a collar or shoulder on which the bearing rotor can be supported as it descends, or as a pin which engages into corresponding cutouts in the bearing rotor and on which the bearing rotor can be supported in the event of a fault.

Furthermore, provision may optionally also be made of a stabilizer module or stabilizer unit for active and/or passive transverse position stabilization, at least one distance sensor for a distance control being provided for the purpose of active transverse position stabilization.

A vibration damper or a device for active or passive vibration isolation may be disposed between the carrier head and the carrier. This advantageously has the effect that the substrate is decoupled from the carrier head and a transverse position stabilization is possibly already achieved.

The modular construction permits a simplified installation and maintenance, which saves costs particularly in factory processes, in particular in high-precision coating processes of large-area substrates such as, for instance, optical displays and the like. Therefore, even substrates which have dimensions of more than $1 \times 1$ m$^2$ and typical thicknesses of less than 100 μm and which are transported at least occasionally at considerable speeds of more than 1 m/s can be transported securely and positionally accurately.

The drive module expediently contains a magnetic accelerating device formed as a flat linear motor. The linear motor may have a single stator; as an alternative, the linear motor may have a double stator. Furthermore, the linear motor may be an asynchronous motor. A synchronous motor may optionally be used. It goes without saying that the linear motor may also be formed by a cylindrical linear motor.

As an alternative, a preferably magnetic or pneumatic pulsed drive may be provided.

The drive module may have a unit for acceleration in a gravitational field, in particular a transport path with gradient. Braking is expediently effected by of magnetic or electromagnetic measures.

In one preferred configuration, the drive module has a T-shaped stator and a U-profile support into which the stator part engages with a first longitudinal limb and covers the U-profile support at its open end with a transverse limb. An air gap between the transverse limb and the open end of the U-profile support may be made larger than an air gap between the ferromagnet components of the bearing rotor and the electromagnets. Preferably, the U-profile support is disposed between housings of two of the electromagnets, an air gap between the housings and an outer boundary wall of the U-profile support being larger than an air gap between the longitudinal limb and inner boundary walls of the U-profile support. Therefore, structural space is available in order to compensate for a movement instability, in particular a pitching movement or pitch, in the event of tipping of the support module e.g. in a lock. The U-profile support preferably has permanent magnets if a synchronous machine is used for the drive, or is expediently formed as a nonmagnetic metal rail, in particular made of aluminum or aluminum alloy, if an asynchronous machine is used.

In a further favorable configuration, the bearing module, drive module and, if appropriate, stabilizer module are disposed behind a shielding with respect to a process space. The shielding may be formed in optically tight fashion, with the result that it is possible to prevent contamination of the modules by coating material in process chambers. The coating material may impinge on the optically tight shielding at arbitrary angles of incidence without essentially being able to pass behind the shielding. At the same time, there are enough perforations of sufficient size to make it possible to evacuate the module-side space behind the shielding. An advantageous decoupling of the modules from the substrate is achieved. The substrate may be subjected to a wide variety of treatment methods, for example heating by radiant heat, without the modules experiencing any significant influencing. Particularly in the case of a substrate coating method, in particular in plasma-enhanced methods such as cathode sputtering or plasma-enhanced chemical vapor deposition (CVD) methods, in which owing to the relatively high partial pressure during the deposition coating material is undesirably also deposited outside regions to be coated, in particular also behind diaphragms, the optically tight shielding prevents contamination of the modules. This advantageously avoids situations in which coating material is added to narrow air gaps in the modules and/or parasitic linings that form, flake away and contaminate the process chambers or material of such linings is entrained into other process regions. Complicating cleaning steps or even replacement of the modules can be avoided. In one favorable configuration, the shielding may be disposed at least partially on the movable carrier head.

The shielding furthermore enables a decoupling with regard to the temperature of the substrate and/or the coating chambers and/or coating sources possibly present in that it serves as radiation protection against thermal radiation. This may advantageously be supported by a cooling in the region of the modules, for example of coils and coil formers. The shielding may equally be provided with coolants. It is expedient to combine a cooling unit of the modules with a cooling unit for the shielding. The region in which the modules are disposed and which is protected by the shielding advantageously receives only at most 40% of the radiant heat, preferably at most 30%, particularly preferably at most 20%, especially preferably at most 10% of the radiant heat which acts on the substrate while the latter is transported by the bearing module and is subjected to various treatment processes in process chambers.

The device according to the invention enables a variable construction which can easily be adapted to given boundary conditions of a process line.

In one favorable configuration, the substrate can be transported in suspended fashion. As a result, it is possible to avoid disadvantageous warpage and mechanical loading of the substrate during transport with the device. The substrate is preferably disposed beneath the bearing module. As an alternative, the substrate may also be disposed above the bearing module by virtue of the device being constructed upside down in the opposite order. As a result, a mechanical loading of holding elements of the device is reduced and the center of mass of the device is shifted downward, which may have an advantageous effect in the case of vibration-sensitive installations or in vibration-sensitive environments. It is furthermore possible to prevent linings on moving parts which arise over time as a result of coating operations from falling as a result of the movement onto the substrate or onto coating sources and contaminating the latter.

Other features which are considered as characteristic for the invention are set forth in the appended claims.

Although the invention is illustrated and described herein as embodied in a process system and a device for transporting substrates, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
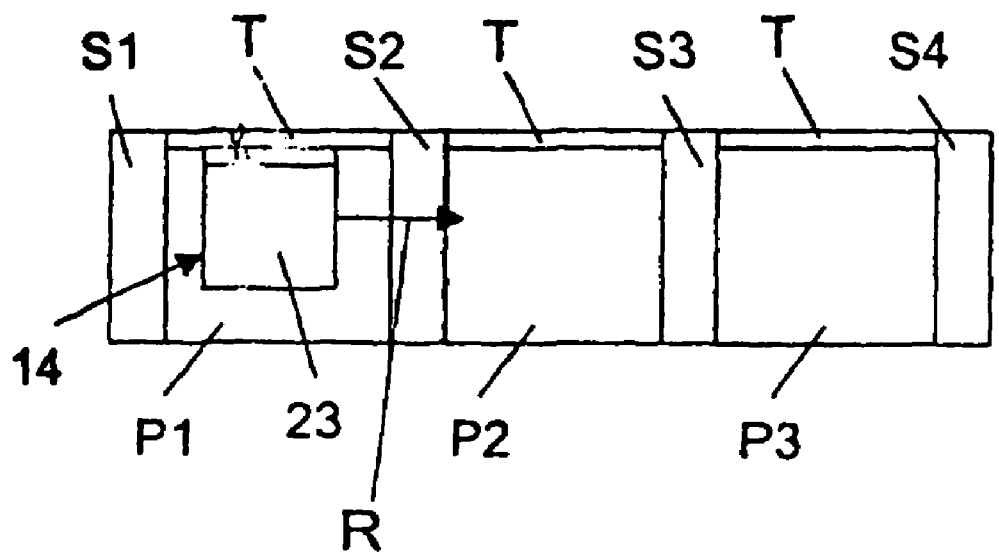
FIG. 1 is diagrammatic illustration of a detail from a coating process line with a transport path interrupted at locks.

Referring now to the figures of the drawing in detail and first, particularly, to FIG. 1 thereof, there is shown schematically a detail from a coating process line with process chambers P1, P2, P3 and locks S1, S2, S3, S4 and also a transport path T interrupted at the locks. The process chambers P1, P2, P3 may be cleaning chambers, plasma treatment chambers, etching chambers, coating chambers, heating chambers and the like. In the process chamber P1, a substrate 23 is fixed by a carrier 14 on the device according to the invention, the device contains at least one bearing module with a bearing stator and an actively magnetically mounted bearing rotor and a drive module. It goes without saying that a control device with distance sensors is provided for active magnetic mounting, but is not shown in the drawings for the sake of simplifying the illustration.

The bearing module has a bearing stator with actuators formed as electromagnets and a bearing rotor with a ferromagnet component. According to the invention, an actuator pair with an assigned gap region is formed by at least two actuators disposed at a distance from one another and active magnetic mounting of the bearing rotor in the gap region is provided.

It is preferably provided that the bearing stator has at least two actuator pairs each with an assigned gap region, the actuator pairs being disposed at a distance from one another, and the bearing rotor engages in the gap regions on both sides with its ferromagnet component. A plurality of actuator pairs are provided along the direction of movement on the transport path, resulting in a segmentation of the bearing stator. In order to ensure a positional stability of the bearing rotor, it is provided that in each case four actuator pairs are assigned to a bearing rotor of given length. In one preferred embodiment of the invention, it is provided that for one bearing rotor six or more actuator units are involved in. compensation of the force due to weight. Therefore the installation can still be operated with an actuator having failed. The length of a bearing rotor is preferably at least equal to the length of a bearing stator segment.

Figure 2:
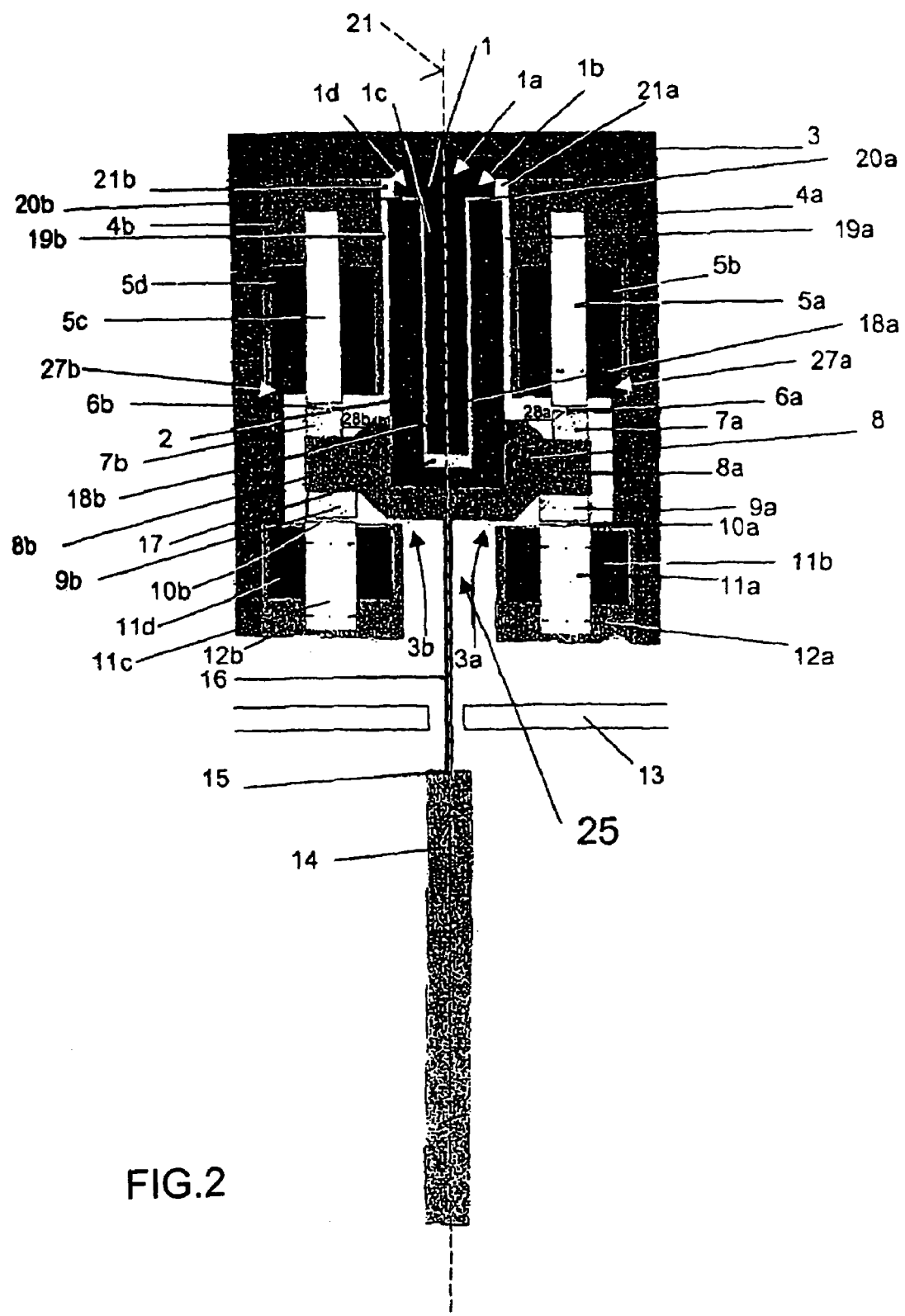
FIG. 2 is a diagrammatic, cross-sectional view through a first embodiment of a device according to the invention.

FIG. 2 elucidates a preferred device for transporting a substrate such as can be used in particular in a preferred process system for transporting the substrate on a transport path in a coating process line by use of vacuum coating methods such as PVD or CVD.

The device has a housing 3 in its head region. The housing 3 is preferably water-cooled. A bearing rotor 8 is formed as a carrier head of the carrier 14. A drive module 1 makes it possible to move the bearing rotor 8 perpendicular to the plane of the illustration.

The drive module 1 contains a T-shaped magnetic accelerating unit 1a, which may be formed as a synchronous machine or else as an asynchronous machine. A stator 1b engages into a U-profile support 2 with its longitudinal limb 1c and covers the U-profile support 2 at its open end with a transverse limb 1d. As an alternative, a preferably magnetic or pneumatic pulsed drive may be provided.

There is disposed at the opposite end of the U-profile support 2 the carrier head 8 with the carrier 14 that is fixed thereto and extends away from the carrier head 8. A connecting element 16 is preferably provided between the carrier head 8 and the carrier 14, the connecting element engaging on a carrier fixing 15 on the carrier 14. The connecting element 16 is preferably formed from sheet metal and vibration-decouples or damps the carrier 14 and thus the substrate from the carrier head 8.

A bearing module 25 preferably has an active and/or passive transverse position stabilization. A stabilizer unit is provided for this purpose. A passive transverse position stabilization is achieved if the connecting element 16 is formed taking account of the moment of inertia of the carrier in such a way that vibration isolation is achieved. For this purpose, the system connecting element 16 and the carrier 14 are configured in such a way that the principal natural frequencies are lower than typical frequencies occurring during the movement of the rotor. The connecting element 16 preferably has a relatively low bending stiffness. Typical frequencies of the rotor movement are 100 Hz, while the preferred natural frequencies of the system connecting element 16 and carrier 14 are chosen at 5 Hz.

As an alternative or in addition, provision is made of electromagnets not illustrated in FIG. 2 for the purpose of active transverse position stabilization, with which electromagnets it is possible to produce magnetic active areas which are directed transversely with respect to the longitudinal axis 21 and interact with the ferromagnet components of the bearing rotor. A corresponding control contains at least one distance sensor. Preferably, but not exclusively, provision is made for preventing low-frequency reverberation of the carrier by the active damping measures.

A shielding 13 is provided as thermal protection in a region between the bearing rotor 8 and the carrier 14.

In accordance with FIG. 2, the bearing rotor 8 is held on both sides between two mutually opposite electromagnets 5a and 11a and, respectively, 5c and 11c. The electromagnets 5a, 5c are mounted on projections 27a, 27b in the housing 3. The cores of the electromagnets 5a, 11a, 5c, 11c are surrounded by coils 5b, 11b, 5d, 11d, each electromagnet 5a, 11a, 5c, 11c being surrounded by a housing 4a, 4b, 12a, 12b.

The electromagnetic active areas of the electromagnets 5a, 11a and 5c, 11c which bring about the magnetic levitation of the bearing rotor 8 are disposed perpendicular to the longitudinal axis 21, the carrier 14 and thus the substrate being arranged parallel to the longitudinal axis 21.

The bearing rotor 8 has holding elements 8a, 8b. Each holding element 8a, 8b has ferromagnet components 7a, 9a, 7b, 9b on its surfaces facing the electromagnets 5a, 11a, 5c, 11c.

The bearing rotor 8 engages on both sides with the ferromagnet components 7a, 9a, 7b, 9b, disposed on the holding elements 8a, 8b transversely with respect to the longitudinal axis 21, between the mutually opposite electromagnets 5a, 11a, 5c, 11c. The illustrated configuration of the bearing rotor 8 and the electromagnets 5a, 11a, 5c, 11c has a passive transverse position positioning of the bearing rotor 8 relative to the electromagnets. In a further embodiment of the invention, an active transverse position positioning is provided, for which further electromagnets and, if appropriate, further ferromagnet components and also at least one distance sensor are provided.

The electromagnets 5a, 5c and 11a, 11c engaging around the bearing rotor 8 are expediently formed with different sizes. On the underside of the bearing rotor 8, by way of example, the electromagnets 11a and 11b are wider with their core than the cores of the electromagnets 5a, 5b lying on the top side of the bearing rotor 8. An air gap 28a is formed between the electromagnets 5a and 11a and an air gap 28b is formed between the electromagnets 5c and 11c, into which the bearing rotor 8 engages.

The elements 7a, 7b opposite the electromagnets 5a, 5c are adapted to the size of the core of the electromagnets and here are smaller than the elements 9a, 9b opposite the electromagnets 11a, 11c. Air gaps 6a, 6b and 10a, 10b are formed between the elements 7a, 7b and 9a, 9b, respectively, and their opposite electromagnets 5a, 5c and 11a, 11c, respectively.

An air gap 17 between the free end of the stator part 1b and the bottom of the U-profile support 2 is made very large, e.g. 1 to 3 cm, preferably 1.5 to 2.5 cm, particularly preferably 2 cm. At the free end of the U-profile support 2, an air gap 20a and 20b is formed between the end faces of the free end and the transverse limb 1d.

The air gap 20a, 20b between the transverse limb 1d and the open end of the U-profile support 2 at its end faces is larger than the air gap 6a, 6b between the ferromagnet components of the bearing rotor 8 and the electromagnets 5a, 5c.

An air gap 19a, 19b between the housings 4a, 4b and an outer boundary wall of the U-profile support 2 is larger than an air gap 18a, 18b between the longitudinal limb 1c and inner boundary walls of the U-profile support 2.

Catch bearings 3a, 3b, formed as a shoulder within the housing 3, are provided for holding the bearing rotor 8 in the event of control faults or in the event of power failure. The catch bearings 3a, 3b are in each case formed by housings 12a, 12b of the electromagnets 11a, 11c.

It goes without saying that the arrangement of the support module 25, the drive module 2 and a possible stabilizer module may also be formed differently than the arrangement illustrated. Thus, the substrate 23 may also be arranged above the support module 25 instead of beneath the support module 25. The carrier head 8 and a non-illustrated carrier foot in which the carrier 14 or the substrate is guided or mounted may be disposed oppositely to the illustration shown.

Figure 3:
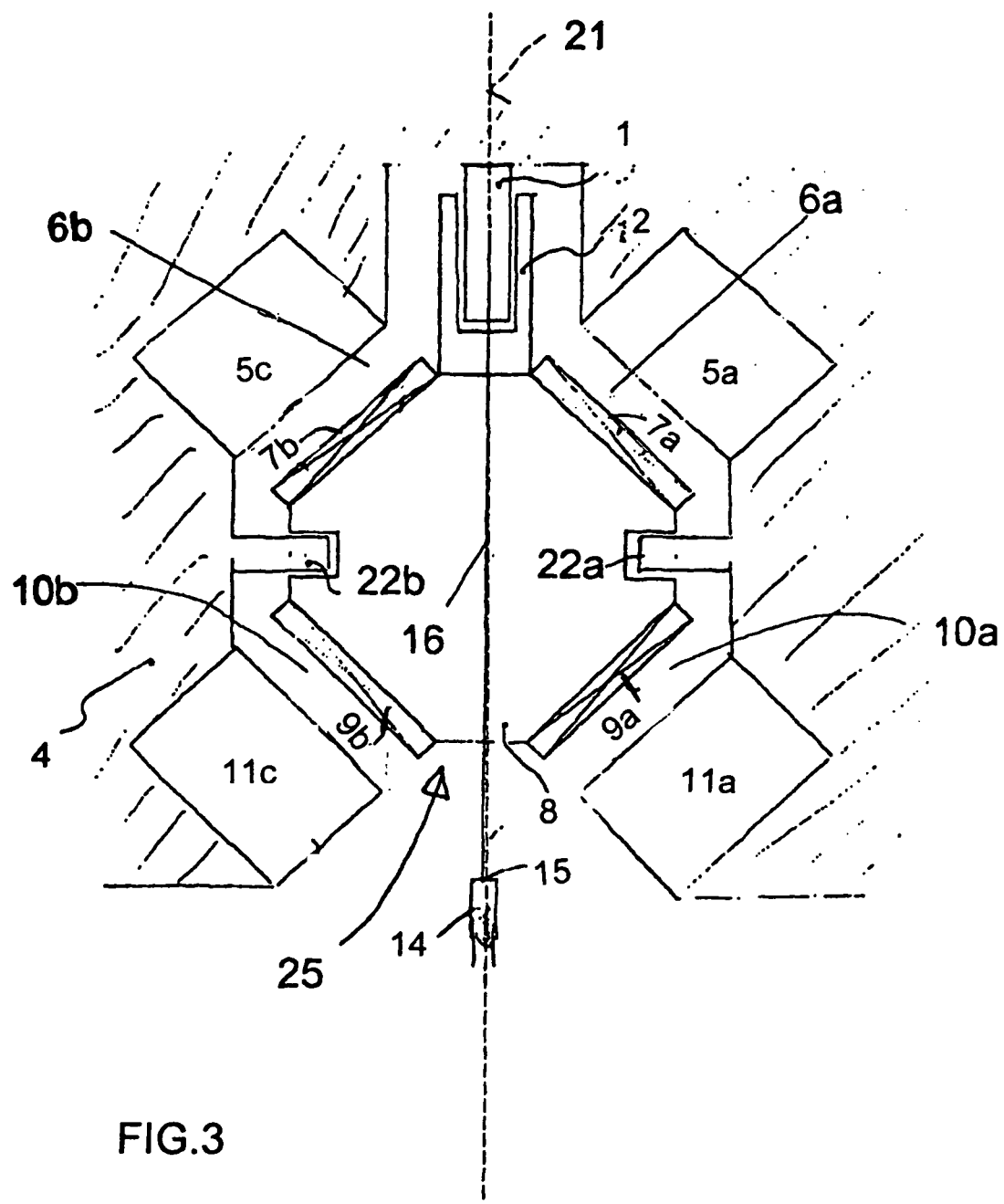
FIG. 3 is diagrammatic illustration of a second embodiment of the device according to the invention in a so-called 45° configuration.

FIG. 3 illustrates an alternative configuration of the device according to the invention in a tilt configuration in a simplified illustration. Preference is given to a configuration with a tilting of the electromagnets of at most 45°, preferably 10° to 15°, with respect to the longitudinal axis 21. Elements remaining the same have the same reference symbols as in the previous figures. For explanation of the function of the individual elements, reference is made to the previous description of FIGS. 1 and 2. The electromagnets 5a, 11a, 5c, 11c are tilted in such a way that their electromagnetic active areas are no longer disposed perpendicular to the longitudinal axis 21, but rather adopt an angle, preferably of less than 45°, with respect thereto. The bearing rotor 8 correspondingly has an octagonal cross section. Catch bearings 22a, 22b are formed in the housing 3 as pins which engage into corresponding cutouts in the bearing rotor 8. In the event of a power failure or a control malfunction, the bearing rotor 8 can be supported on the catch bearings 22a, 22b. At its end faces directly opposite the pairs of electromagnets 5a, 11a and 5c, 11c, the bearing rotor 8 supports the ferromagnets 7a, 9a and 7b, 9b, respectively, with the air gaps 6a, 6b and 10a, 10b, respectively, to the respective electromagnet pairs 5a, 11a and 5c, 11c. In contrast to the configuration in FIG. 2, the distance between the electromagnet pairs 5a, 11a and 5c, 11c is not constant, but rather expands toward the bearing rotor 8 owing to the tilting.

We claim:

1. A process system, comprising:
   a transport path;
   a device for transporting substrates along said transport path, said device including:
      a bearing module having a bearing stator with actuators formed as electromagnets and a bearing rotor with a ferromagnet component, said bearing rotor functioning as a carrier head for a substrate carrier, at least two of said actuators disposed at a distance from one another defining at least one actuator pair with an gap region formed between said actuators, said bearing rotor mounted in an active magnetic mounting manner in said gap region; and
      a drive module.

2. The process system according to claim 1, wherein said actuator pair is at least two actuator pairs each having said gap region, said actuator pairs disposed at a distance from one another, and said bearing rotor engages in said gap region on both sides with said ferromagnet component.

3. The process system according to claim 1, wherein said transport path has interruption regions.

4. The process system according to claim 3, further comprising:
   a coating process line having process chambers;
   locks; and
   said transport path being interrupted in a region of at least one of said locks disposed between said process chambers of said coating process line.

5. A device for transporting substrates along a transport path, the device comprising:
   at least one hearing module having a bearing stator with actuators formed as electromagnets and a bearing rotor with a ferromagnet component, said bearing rotor functioning as a carrier head for a substrate carrier, at least two of said actuators disposed at a distance from one another defining at least one actuator pair with an gap region formed between said actuators, said bearing rotor mounted in an active magnetic mounting manner in said gap region; and
   a drive module.

6. The device according to claim 5, wherein said at least one actuator pair is at least two actuator pairs each having said gap region, said actuator pairs disposed at a distance from one another, and said bearing rotor engages in said gap region on both sides with said ferromagnet component.

7. The device according to claim 5, wherein said drive module contains a magnetic acceleration device.

8. The device according to claim 5, further comprising a shielding disposed between said bearing module and said drive module and a process space.

9. The device according to claim 5, wherein the substrate is disposed beneath said bearing module.

10. The device according to claim 5, wherein said substrate is disposed above said support module.

11. A device for transporting substrates along a transport path, the device comprising:

at least one bearing module having a bearing stator with actuators formed as electromagnets and a bearing rotor with a ferromagnet component, at least two of said actuators disposed at a distance from one another defining at least one actuator pair with an gap region formed between said actuators, said bearing rotor mounted in an active magnetic mounting manner in said gap region; and a drive module including:
- a T-shaped stator part having a first limb and a transverse second limb; and
- a U-profile support into which said T-shaped stator part engages with said first limb and covers said U-profile support at an open end with said transverse second limb.

12. The device according to claim 11, wherein:

said transverse second limb and said open end of said U-profile support define a first air gap therebetween; and said ferromagent component and said electromagnets define a second air gap therebetween being smaller than said first air gap.

13. The device according to claim 11, further comprising housings housing said electromagnets, said U-profile support disposed between said housings of two of said electromagnets and having an outer boundary wall and inner boundary walls, said housings and said outer boundary wall defining a first air gap therebetween, said first limb and said inner boundary walls defining a second air gap being smaller than said first air gap.

14. A device for transporting substrates along a transport path, the device comprising:

at least one bearing module having a bearing stator with actuators formed as electromagnets, a stabilizer unit for a passive transverse position stabilization, and a bearing rotor with a ferromagnet component, at least two of said actuators disposed at a distance from one another defining at least one actuator pair with an gap region formed between said actuators, said bearing rotor mounted in an active magnetic mounting manner in said gap region; and a drive module.

15. A device for transporting substrates along a transport path, the device comprising:

at least one bearing module having a bearing stator with actuators formed as electromagnets, a stabilizer unit for an active transverse position stabilization, and a bearing rotor with a ferromagnet component, at least two of said actuators disposed at a distance from one another defining at least one actuator pair with an gap region formed between said actuators, said bearing rotor mounted in an active magnetic mounting manner in said gap region; and a drive module.

* * * * *